United States Patent [19]

Levin

[11] Patent Number: 5,540,093
[45] Date of Patent: Jul. 30, 1996

[54] METHOD FOR OPTIMIZING THE ALIGNMENT OF A HORIZONTAL BOREHOLE RELATIVE TO THE STRIKE OF ROCK-LAYER STRESS PLANES

[75] Inventor: Franklyn K. Levin, Houston, Tex.

[73] Assignee: Western Atlas International, Houston, Tex.

[21] Appl. No.: 339,959

[22] Filed: Nov. 15, 1994

[51] Int. Cl.$^6$ .................... G01V 1/38; G01V 1/20
[52] U.S. Cl. .................... 73/151; 367/16; 367/55; 367/75
[58] Field of Search ............... 73/152, 151; 367/55, 367/56, 16, 37, 75

[56] References Cited

U.S. PATENT DOCUMENTS

| Re. 22,535 | 8/1944 | Shimek | 177/352 |
|---|---|---|---|
| 4,207,619 | 6/1980 | Klaveness | 367/36 |
| 4,357,689 | 11/1982 | Ruehle | 367/23 |
| 4,403,312 | 9/1983 | Thomason | 367/56 |
| 4,713,968 | 12/1987 | Yale | 73/594 |
| 4,736,349 | 4/1988 | Goins et al. | 367/75 |
| 4,789,969 | 12/1988 | Naville | 367/36 |
| 4,794,572 | 12/1988 | Sondergeld et al. | 367/31 |
| 4,817,061 | 3/1989 | Alford et al. | 367/75 |
| 4,955,952 | 9/1990 | Williams et al. | 181/111 |

OTHER PUBLICATIONS

Thomsen, L., "Reflection Seismology Over Azimuthally Anisotropic Media," Geophysics, vol. 53, No. 3 (Mar. 1988), pp. 304–313.

Primary Examiner—Hezron E. Williams
Assistant Examiner—J. David Wiggins
Attorney, Agent, or Firm—William A. Knox

[57] ABSTRACT

As a means for determining the preferred azimuthal alignment of a horizontal borehole, the reflection travel time vectors between an acoustic source and a plurality of equidistant seismic receivers are measured along a plurality of directional wavefield trajectories. The travel time vectors are resolved to measure the angular orientation of the strike of vertical stress patterns. The alignment of the horizontal borehole is directed perpendicularly to strike.

7 Claims, 2 Drawing Sheets

METHOD FOR OPTIMIZING THE ALIGNMENT OF A HORIZONTAL BOREHOLE RELATIVE TO THE STRIKE OF ROCK-LAYER STRESS PLANES

BACKGROUND OF THE INVENTION

1. Field of the Invention

A method for measuring the principle axis of stress patterns, particularly those due to vertical fracturing, of earth layers beneath a body of deep water. The azimuthal alignment of a horizontal borehole is optimized based on the result of such measurements.

2. Discussion of Related Art

Although the art of seismic exploration is very well known, it will be briefly reviewed to provide definitions of technical terms to be referenced herein.

An acoustic source of any desired type such as, by way of example but not by way of limitation, a vibrator, an explosive charge, a sonic boom, an air or gas gun, or an earth impactor, is triggered to propagate a wavefield radially from the source location. The wavefield insonifies subsurface earth formations whence it is reflected therefrom to return to the surface. The mechanical earth motions due to the reflected wavefield are detected as electrical signals by an array of seismic receivers or receiver groups distributed at preselected spaced-apart group intervals, at or near the surface of the earth, along a designated line of survey, offset from the source.

Hereafter for brevity, the term "receiver" unless otherwise qualified, means either a single seismic receiver or a relatively compact group of interconnected seismic receivers. The mechanical motions detected by the receivers are converted to electrical or optical signals which are transmitted over ethereal, electrical or optical data-transmission links to a multi-channel recording device. Usually, each receiver is coupled to a dedicated recording channel. An array may encompass many tens or hundreds of receivers which are coupled by a transmission link to a corresponding number of data-recording channels. To reduce the need for an excessive number of individual data transmission lines between the receivers and the recording channels, the receivers share a relatively few common transmission lines and the signals from each receiver are multiplexed into the appropriate data-recording channels by any convenient well-known means.

In operation, the selected source type successively occupies a plurality of source locations along the line of survey, emitting a wavefield at each location. After each emission, the source is advanced along the line by a multiple of the receiver spacing interval. At the same time, the receiver array is advanced along the line of survey by a corresponding spacing. In other arrangements such as for use with 3-D studies, the sources and receivers are emplaced at the intersections of a uniformly-spaced coordinate grid and the data are binned.

Sedimentary earth layers are initially laid down more or less horizontally. Later, the earth layers may become tilted or stressed so that vertical fracturing occurs, particularly in the more brittle rocks such as, for example, the Austin chalk. If the orientation of the principal axis of stress is known, horizontal boreholes can be directed perpendicular to the fracture plane to maximize oil and/or gas recovery. Seismic methods may be used in geophysical exploration to study vertical fracturing.

Because of anisotropy, it is known that the velocity of seismic waves, including both compressional waves and polarized shear waves, propagating through the earth layers varies as a function of the azimuth of the wavefield trajectory relative to the orientation of the plane of a vertical fracture pattern. The propagation velocity of a seismic wavefield is faster parallel to the fracture plane, that is, along strike, than perpendicular thereto. For various reasons, use of shear waves is preferred over compressional waves by geophysicists because there is said to be a greater velocity contrast. For example, see U.S. Pat. No. 4,817,061, issued Mar. 28, 1989 to R. M. Alford et al.

Leon Thomsen, in a paper published in *Geophysics, v. 53, n.5, March, 1988*, entitled REFLECTION SEISMOLOGY OVER AZIMUTHALLY ANISOTROPIC MEDIA, teaches a method using shear waves. He, like Alford denigrates the use of compressional waves for anisotropy studies because the azimuthal-dependent velocity variation of compressional waves is said not to be very large and is said to be difficult to evaluate particularly with noisy data signals.

Although use of shear waves is preferred, shear waves cannot propagate in a fluid. Therefore, in deep water there is no choice but to use compressional waves. Because shear waves are undetectable directly in deep water, Mallick, in U.S. patent application Ser. No. 08/254,306, filed 06/06/94 and assigned to the assignee of this invention, proposes to use compressional waves in deep water. In his method, the compressional-wave amplitude vectors as derived from CMP (common mid-point) gathers along two or more lines of profile having known but different orientations, are resolved to identify the azimuth of the principal anisotropic axis.

The method of Mallick is a useful approach but it is complex and expensive of data-processing time. There is a need for a deep water system that is easy to implement in the field and that will provide seismic data signals that can be resolved inexpensively in the laboratory.

SUMMARY OF THE INVENTION

A method and means is disclosed for measuring the orientation of the principal axis of vertical stress in earth layers beneath a body of water. An acoustic seismic wavefield is launched along trajectories directed along three or more preselected geographic azimuths from an acoustic source to each one of three seismic sensors offset equidistantly from the source, after reflection of the wavefield from one or more selected subsurface earth layers. The differential reflection travel times between source and sensors is measured. The measured time differentials are resolved with the respective trajectory azimuths to determine the axial orientation of the principal plane of the rock-layer stress pattern. From those data, the direction of a horizontal borehole can be optimized.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DISCUSSION OF THE PREFERRED EMBODIMENT

Figure 1:
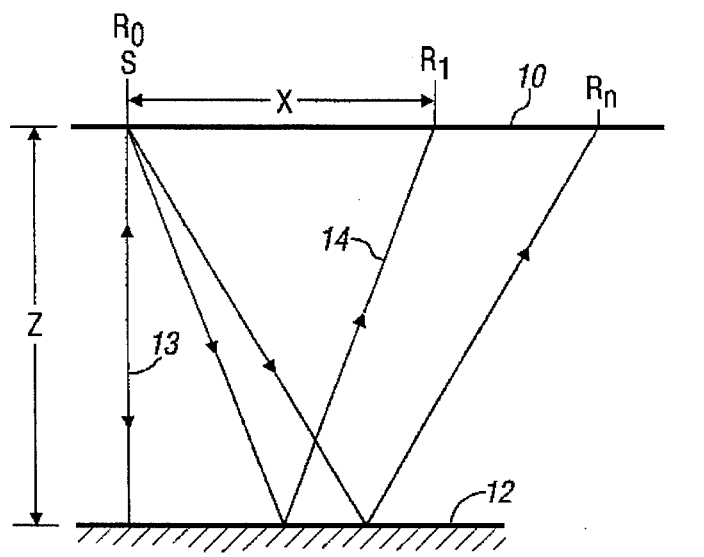
FIG. 1 illustrates the basic concepts of reflection seismometry.

FIG. 1 is a schematic representation of the basic concepts of seismometry. A acoustic source S occupies a selected location at or near the surface 10 of the earth. Seismic signal receivers are located at $R_0$ and $R_1$, $R_1$ being offset from S by a distance X while $R_0$ is located at zero offset. Source S generates a wavefield that propagates from S to a subsurface earth layer 12 at a depth Z beneath surface 10. The wavefield is reflected from 12 along wavefield trajectories 13 and 14 to receiver $R_0$ and $R_1$. Additional redundant receivers $R_1$, l=1, 2, 3, . . . ,n, may be emplaced between $R_0$ and $R_1$ or beyond $R_1$ as shown.

The two-way reflection travel time, t, along wavefield trajectory 13 to $R_0$ is $$t=2Z/V_a.$$

The two-way reflection travel time, T, along trajectory 14 to $R_1$ is $(t+\Delta t)$, where $\Delta t$ is excess time over t due to the slant travel path. The reflection travel times to a selected reflecting horizon can be measured directly from the recorded seismic reflection recordings. From those measurements, the average velocity between the surface 10 and a reflecting horizon 12 can be computed from $$V_a^2 = X^2/(2t\Delta t + \Delta t^2). \tag{1}$$

Thus, the reflection travel time is an inverse function of velocity.

Figure 2:
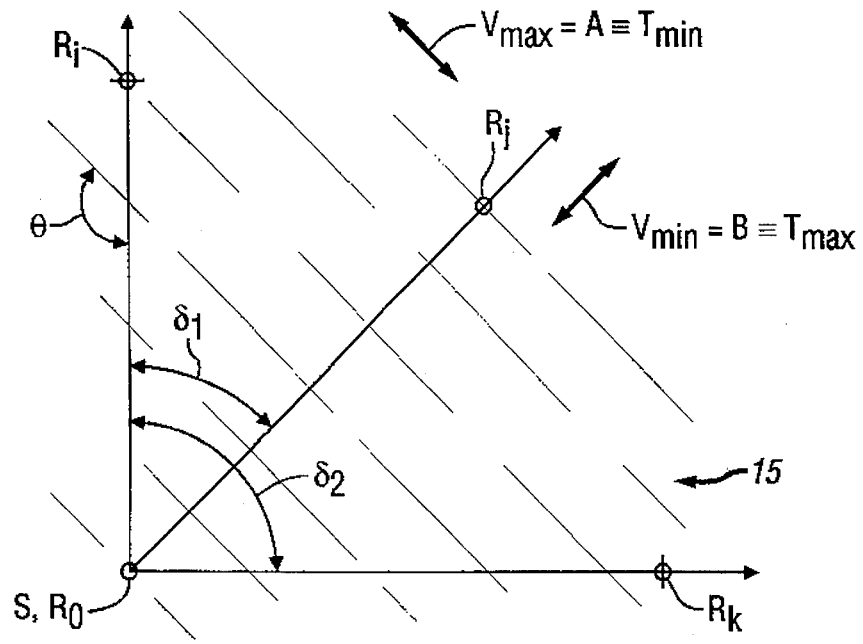
FIG. 2 shows a possible arrangement of seismic lines of survey with respect to the orientation of the principal axis of vertical stress.

FIG. 2 shows an acoustic source S placed at a desired location in an area to be studied. Receivers $R_i$, $R_j$, $R_k$ are shown located equidistantly along three different trajectory azimuths $\Theta_0$, $\Theta_1$, $\Theta_2$ relative to, for example, geographic north. The broken lines 15 represent the orientation of the strike of vertical fracture planes in a subsurface rock layer, beneath which lies a reflecting horizon. The angle $\epsilon$ is the azimuth of the fracture or stress planes 15.

For purposes of this disclosure, the principal axis of the stress plane is defined as being parallel to the strike. As before stated, the maximum-velocity vector $V_{max}$ is aligned with the principal axis as shown by the double-headed arrow and corresponds to a minimum travel-time vector $T_{min}$. The minimum-velocity vector $V_{min}$ lies along the transverse axis as shown by the appropriate arrows and corresponds to a maximum travel-time vector $T_{max}$.

Figure 3:
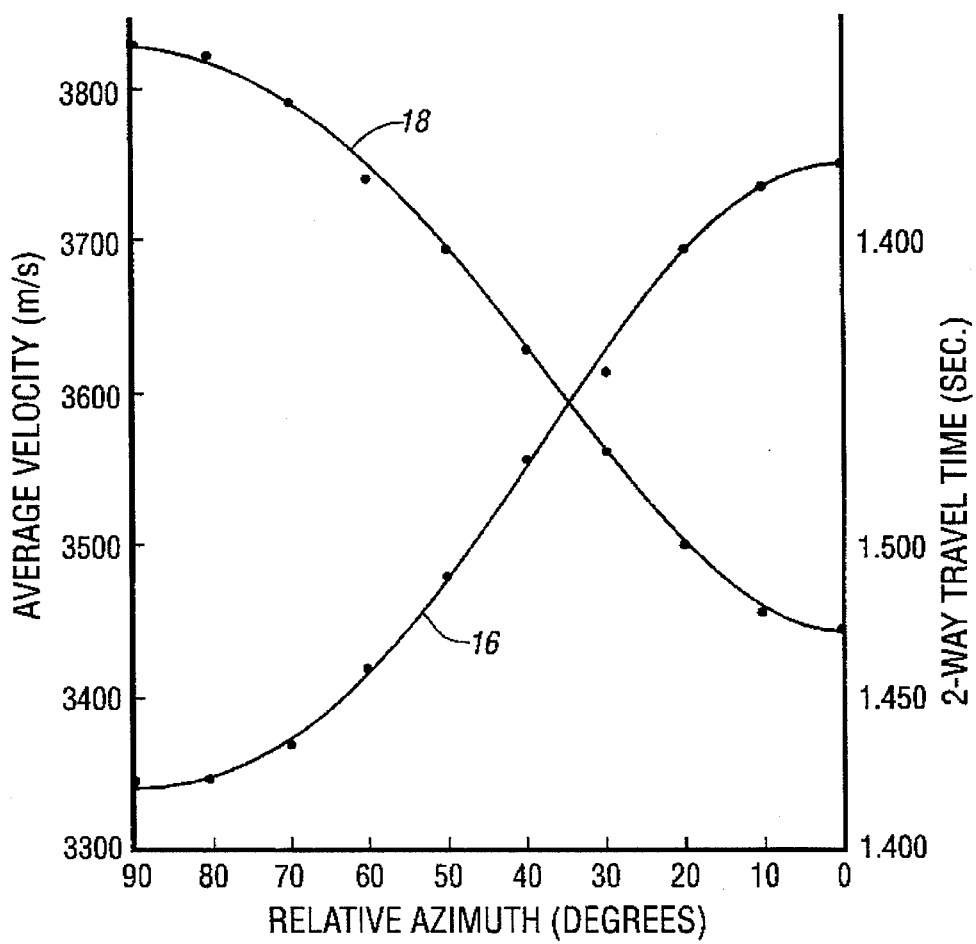
FIG. 3 is a graph showing the variation of average velocity and two-way reflection travel time as a function of relative azimuth between a wavefield trajectory and the axis of the principal vertical stress plane.

FIG. 3 shows a graph, 16, of average velocity as a function of the relative azimuth, $\epsilon$, between a wavefield trajectory and the principal axis of a vertically-fractured rock layer. Despite the protests of earlier workers in the art that compressional-wave velocities do not show significant variation as a function of relative angle, I have discovered that substantial anisotropy does indeed actually exist as shown by graph 16.

Figure 4:
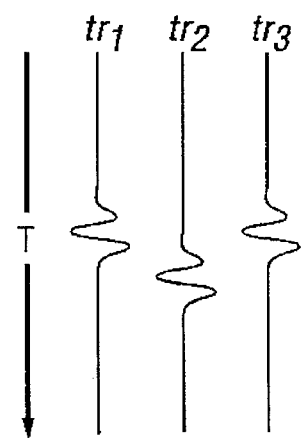
FIG. 4 represents seismic traces showing the time delays associated with three equidistant receivers due to anisotropy.

As predicted by (1), the two-way travel time to a receiver offset 1250 meters from a source S, due to a reflection from a bed at 2500 meters, graph 18, is inversely proportional the average velocity shown for graph 16. For example, see FIG. 4, which illustrates reflected events on three seismic traces $tr_1$, $tr_2$ and $tr_3$ such as might have been recorded along the three wavefield trajectories of FIG. 2. The middle trace, $tr_2$ exhibits the longest reflection travel time because that line is substantially perpendicular to the principal axis whereas the other lines lie at a 45° angle to strike. It is therefore apparent that the orientation of the principal axis of the vertical stress pattern of a rock layer can be measured simply by resolving the travel-time differences with the azimuths of two and preferably three wavefield trajectories. In effect, the travel times between a source S, and the respective receivers $R_1$, as measured along the wavefield trajectories along azimuths $\Theta_1$, and read from the seismic traces define travel-time vectors. Either velocity vectors or travel-time vectors may be used. For simplicity, the method of this disclosure will be illustrated using travel-time vectors by way of example but not by way of limitation.

Resolution of the reflection travel time vectors is accomplished as follows. It is assumed that the velocity distribution (and hence the wavefield travel-time vectors for small values of ellipticity) in an anisotropic medium is elliptical so that $$(V_x^2/A^2)+(V_y^2/B^2)=1, \tag{1}$$

where $V_x$ and $V_y$ are the velocity vectors along the semi-major and semi-minor axes A and B of the elliptical distribution. But equation (1) is not useful because the quantity that is actually determined along some arbitrary directional wavefield trajectory is the vector sum, V, of the velocity components given by $$V^2=V_x^2+V_y^2. \tag{2}$$

Velocity is a computed quantity; the quantity actually measured from seismic records is travel time which, as previously explained, is inversely proportional to velocity for small values of ellipticity (on the order of 10%–15%). At least one computational step may be saved by use of travel-time vectors in place of velocity vectors. Therefore the formulations to follow will be developed in terms of travel-time vectors.

Given travel-time vectors $T_1$, $T_2$, $T_3$ as measured along three wavefield trajectories making angular increments $\delta_1$ and $\delta_2$ relative to unknown angle $\Theta$ with respect to the x axis. Then $$(T^2\cos^2\Theta/A^2)+(T^2\sin^2\Theta/B^2)=1 \text{ or } T=AB/\sqrt{(B^2\cos^2\Theta+A^2\sin^2\Theta)}. \tag{3}$$

We now may construct three equations:

$$(T_1^2\cos^2\Theta/A^2)+(T_1^2\sin^2\Theta/B^2)=1, \tag{4}$$

$$(T_2^2\cos^2(\Theta+\delta_1)/A^2)+(T_2^2\sin^2(\Theta+\delta_1)/B^2)=1, \tag{5}$$

$$(T_3^2\cos^2(\Theta+\delta_2)/A^2)+(T_3^2\sin^2(\Theta+\delta_2)/B^2)=1. \tag{6}$$

The three unknowns are A, B and $\Theta$. Let us estimate some value for $\Theta$, say $\Theta_a$. Then we can write (4) and (5) as $$[(T_1\cos\Theta_a)^2/A^2]+[(T_1\sin\Theta_a)^2/B^2]=1, \text{ and} \tag{7}$$

$$[(T_2\cos\{\Theta_a+\delta_1\})^2/A^2]+[(T_2\sin\{\Theta_a+\delta_1\})^2/B^2]=1. \tag{8}$$

Equations (7) and (8) are two linear equations in the two unknowns $(1/A)^2$ and $(1/B)^2$. The equations are solved for $A^*$ and $B^*$ corresponding to $\Theta_a$. Those quantities are now used to estimate $T_3^*$ from (3):

$$T_3^* = A^* B^* / \sqrt{(B^* \cos(\Theta_a + \delta_2))^2 + (A^* \sin(\Theta_a + \delta_2))^2}. \quad (9)$$

Since $\Theta_a$ was estimated, $T_3^*$ will not, in general, equal the measured quantity $V_3$. Form the quantity $$\Delta = T_3^* - T \quad (10)$$

which can be used in any well-known iterative root-finding routine such as ZBRENT or the Gauss-Seidel algorithm, incrementing $\Theta_a$ at each pass until a convergent solution results. The true value for $\Theta$ can be determined to any desired degree of accuracy as is well known. Given the true value for $\Theta$, we can find A and B from equations (4) and (5). The quantity $\Theta$ is the angular departure from a principal axis of the elliptical velocity distribution. As was previously pointed out, either the travel-time vector (a measured quantity) or the velocity vector (a computed quantity) may be used.

By way of a numerical example in terms of velocities, given $V_1 = 3005.5$ meters per second (m/s), $V_2 = 3129.9$ m/s, $V_3 = 3193.3$ m/s, $\delta_1 = 45°$ and $\delta_2 = 290°$. From those quantities, $\Theta$ turns out to be 10°, A is 3000 m/s and B is 3200 m/s.

Figure 5:
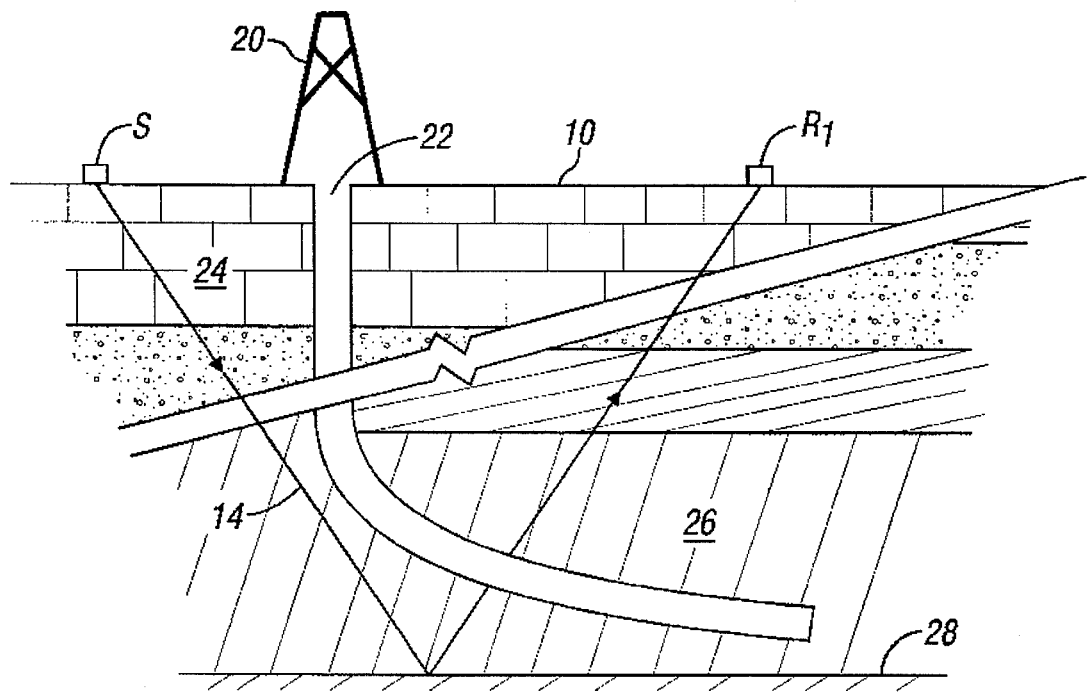
FIG. 5 is a schematic drawing of the lower portion of a horizontal borehole drilled into the earth.

FIG. 5 is intended to illustrate the application of this method to the real world of recovery of economic resources for the benefit of humankind. A drilling rig 20 is located at or near the surface of the earth 10. The term "surface" includes the water surface in marine operations, as well as the ground surface in land production. A borehole 22 penetrates the subsurface earth formations. For substantially horizontal bedding such as 24, vertical boreholes are preferred as they can drain fluids laterally along the bedding planes. For vertically fractured zones such as at 26, the borehole is deviated as shown since the fluid drainage is preferentially vertical. It is important that the borehole be directed perpendicular to strike so as to penetrate a maximum volume of drainage channels. In FIG. 5, the principal axis of vertical stress is aligned at a right angle to the page.

In the best mode of operation, it is important that the reflection data be taken from a formation such as 26 that lies preferably just beneath the preselected target horizon, vertical fracture zone 24. The offset between source S and receiver $R_1$ should be long enough for a substantial portion of the wavefield trajectory to pass through the target zone 24 as shown by raypath 14 of FIG. 5, so that the anisotropic effect can be easily detected yet the offset should not be so long that refracted arrivals contaminate the reflection data.

Because of noise and other interference, it is sometimes difficult to identify a particular reflection on the basis of a single trace. Therefore, is useful to provide a plurality of redundant receivers along the wavefield trajectory such as shown and described with respect to FIG. 2 for receivers $R_0$ to $R_n$ to provide several traces for reflection identification purposes.

It is preferred that the angular divergence between the three trajectory lines be substantially 45°.

Use of the observed reflection travel times resolved about the known azimuths of the directional wavefield trajectories, that is, resolution of the travel-time vectors, provides a novel and elegantly simple method for the measurement of the orientation of the principal axis of the vertical stress planes. The complexities and difficulties of deriving velocities or reflection amplitude vectors as taught by previously-known art are completely eliminated.

It is to be understood that this method specifically excludes the use of binned seismic data as derived from conventional 3-D seismic surveys. The actual wavefield trajectories must lie along the preferred known azimuths with angular divergences as above specified.

This disclosure has been written with a certain amount of specificity by way of example only and not by way of limitation. This invention is limited only by the appended claims. The invention has been described in terms of reflection travel times but of course, velocities as derived from $X^2 - T^2$ calculations are not ruled out.

I claim as my invention:

1. A method for defining the preferred azimuth of a horizontal borehole by measuring the orientation of the principal axis of vertical stress patterns in rock formations beneath a body of water, comprising:

emplacing an acoustic source at a desired location at or near the surface of said body of water;

positioning a first seismic sensor near said surface at a first preselected offset from said acoustic source along a first wavefield-trajectory azimuth;

positioning at least a second seismic sensor near said surface at an offset substantially equal to said first offset from said acoustic source along a second wavefield-trajectory azimuth;

positioning at least a third seismic sensor near said surface at an offset substantially equal to said first offset from said acoustic source along a third wavefield-trajectory azimuth;

causing said acoustic source to emit a compressional acoustic wavefield for receipt by said first, second and third seismic sensors following reflection of said wavefield from said rock formations;

measuring the travel time vectors of said wavefield from said acoustic source to the respective seismic sensors;

vectorially resolving said travel time vectors with said first, second and third wavefield trajectory azimuths to measure the orientation of the principal vertical stress plane; and aligning the direction of said horizontal borehole to extend perpendicular to said measured principal vertical stress plane.

2. The method as defined by claim 1 wherein the angles subtended between said first and second azimuths and said second and third azimuths respectively are substantially equal to 45°.

3. The method as defined by claim 1, comprising:

a plurality of redundant seismic sensors disposed at spaced intervals between said acoustic source and said first, second and third seismic sensors respectively.

4. The method as defined by claim 1, comprising:

optionally converting said time vectors average velocity vectors prior to the step of vectorially resolving.

5. A method for optimizing the azimuth of a horizontal borehole by measuring the orientation of the principal axis of vertical stress in earth layers beneath a body of water, comprising:

launching an acoustic wavefield along trajectories characterized by three different geographic azimuths from a source to each of three equidistant acoustic sensors after reflection of said wavefield from said earth layers;

measuring the travel time vectors of said wavefield between said source and each one of said acoustic sensors;

measuring the orientation of the principal axis of said vertical stress plane by vectorially resolving said travel time vectors with the respective trajectory azimuths; and aligning said horizontal borehole perpendicularly to said principal axis.

6. A method for optimizing the azimuthal alignment of a horizontal borehole relative to the strike of a vertical stress pattern in a preselected subsea rock layer, comprising:

measuring the reflection travel time vectors through said preselected rock layer between an acoustic source and a plurality of equidistant receivers along predetermined directional wavefield trajectories;

vectorially resolving said measured reflection travel time vectors with said directional wavefield trajectories to define the strike of said vertical stress patterns; and aligning said horizontal borehole perpendicularly to said strike.

7. A method for optimizing the alignment of a horizontal borehole relative to the principal plane of a vertical fracture pattern in a preselected subsurface rock layer, comprising:

measuring the reflection travel-time vectors of an acoustic wavefield propagating through said preselected rock layer along predetermined directional wavefield trajectories between an acoustic source and a plurality of equidistant receivers;

converting said measured travel-time vectors to velocity vectors;

resolving said velocity vectors-with said directional wavefield trajectories to define the strike of said vertical fracture pattern; and aligning said horizontal borehole perpendicular to the strike.

* * * * *